W. C. GOWDY.
ANIMAL TRAP.
APPLICATION FILED FEB. 24, 1912.
1,055,163.
Patented Mar. 4, 1913.
2 SHEETS—SHEET 2.
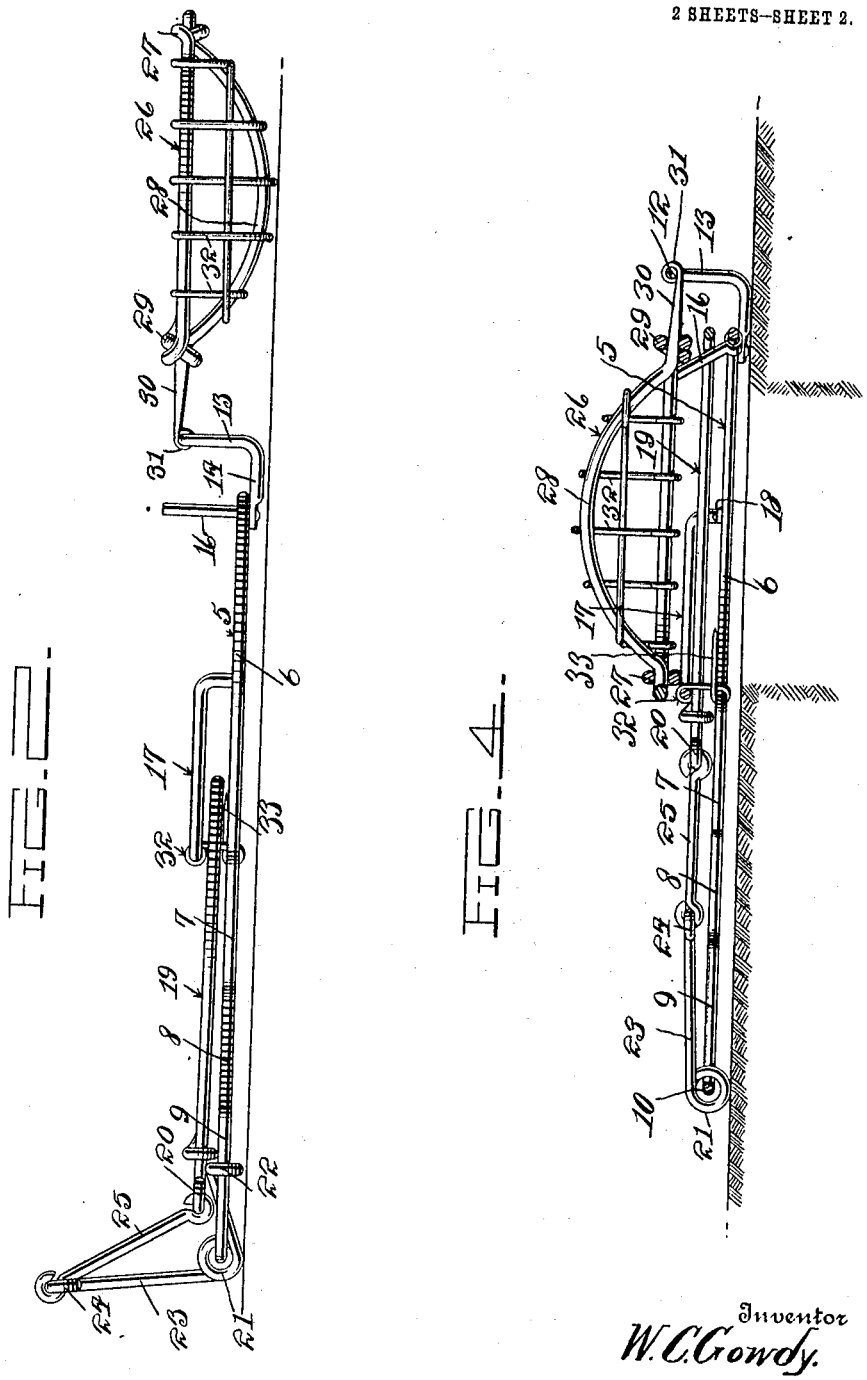
Witnesses
F. N. Taylor
George Tate
Inventor
W. C. Gowdy.
By Crandall & Crandall
Attorneys

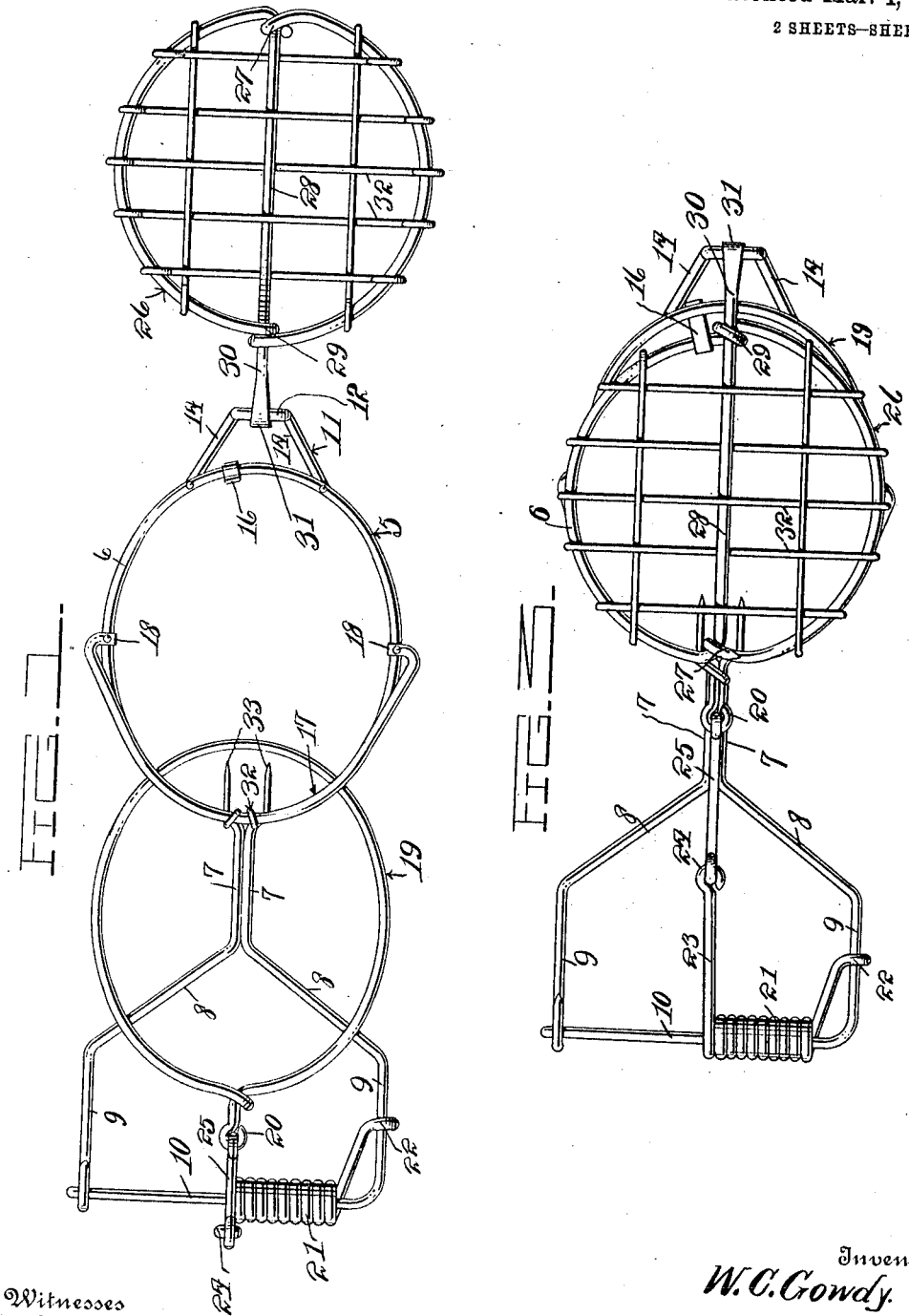

UNITED STATES PATENT OFFICE.

WILLIAM C. GOWDY, OF FRESHFIELD, ALBERTA, CANADA.

ANIMAL-TRAP.

1,055,163.

Specification of Letters Patent.   Patented Mar. 4, 1913.

Application filed February 24, 1912. Serial No. 679,644.

*To all whom it may concern:*

Be it known that I, WILLIAM C. GOWDY, a subject of the King of Great Britain, residing at Freshfield, in the Province of Alta, Dominion of Canada, have invented certain new and useful Improvements in Animal-Traps; and I do hereby declare the following to be a full, clear, and exact description of the invention, such as will enable others skilled in the art to which it appertains to make and use the same.

This invention relates to an improvement in traps especially designed for capturing gophers, although the invention may be employed with equal success in catching other kinds of animals.

The principal object of the invention is to provide a trap which includes relatively stationary and movable strangulating rings, a bait plate normally disposed under said rings, and a trigger engageable with the bait plate and the movable ring for holding the parts in their operative relations, and to automatically release said rings from pressure exerted upon the bait plate by an animal.

Another object of the invention is to provide a trap for the purpose described, which is positive in action, is simple in construction, and is cheap to manufacture.

With these and other objects in view, the invention consists in the construction and novel combination of parts hereinafter fully described, illustrated in the accompanying drawings, and pointed out in the appended claims; it being understood that various changes in the form, proportion, size and minor details of construction within the scope of the claims, may be resorted to without departing from the spirit or sacrificing any of the advantages of the invention.

In the drawings: Figure 1 is a plan view of a trap constructed in accordance with my invention, the parts thereof being shown in their inoperative positions, Fig. 2 is a side elevation thereof, Fig. 3 is a plan view of such a trap showing the parts in their operative positions, and Fig. 4 is a longitudinal sectional view through the same.

Like reference numerals designate corresponding parts in all the figures of the drawings.

Referring to the drawings, 5 designates generally the main frame of the trap. This frame consists of a length of rod iron which is centrally bent to form a relatively stationary strangulating ring 6, the end portions 7—7 beyond the ring being disposed in ground engagement and terminating in outwardly directed arms 8—8 and thence in forwardly directed spaced side arms 9—9, the free ends of the latter being connected by a cross bar 10.

Secured to the ring 6 at a point diametrically opposite the end portions 7—7 is a bracket, designated as a whole by the reference numeral 11. This bracket is formed from a single length of stout wire, which is bent to form a U-shaped central portion which is disposed in a plane at right angles to the plane of the frame, and includes a bight 12 and legs 13—13, said legs terminating in diverging arms 14—14, the ends thereof being riveted or otherwise secured to the ring 6. It will be noted in this connection that the bight 12 forms a pivot, and is disposed above the plane of the frame 5. The ring 6 intermediate the arms 14—14 is reduced to form a pivot upon which a trigger 16 is mounted for swinging movements. Disposed below and in spaced relation to that portion of the ring 6 adjacent the end portion 7, is a semi-circular guide element 17. This element is formed from a single length of rod metal, and has its ends 18—18 bent downwardly at right angles and secured by rivets or other suitable means to the upper face of said ring 6.

The invention further comprises a relatively movable strangulating ring 19. This ring is preferably formed of a single length of wire, and is preferably elongated, the ends being connected in any suitable manner and one of the ends terminates in an eye 20. This ring is normally disposed between the guide element 17 and the ring 6, the eye 20 being disposed toward the cross bar 10 of the frame. Mounted upon the cross bar 10 is a coil spring 21, one end 22 thereof being wrapped around the adjacent side arm 9 of the frame, and the other end terminating in a radially extending arm 23, the end thereof being formed with an eye 24. A link 25 has one end connected to the eye 20 of the ring 19, and the other end to the eye 24 of the arm 23. It will be thus observed that by means of this spring, the relatively movable strangulating ring is urged to move in the direction of the cross bar 10.

The invention further comprises a bait plate, which is designated as a whole by the reference numeral 26. This plate consists of a frame which is preferably formed from a single length of wire, and one end thereof is bent to form an eye 27. This wire is bent to form a circle, and has its free end projecting through the eye 27 and terminating in a central convexed supporting end 28, said end passing through an eye 29 formed by the ring diametrically opposite the eye 27 and terminating beyond said eye 29 in an arm 30, the free end thereof being flattened to form an eye 31 which is engageable with the bight portion or pivot 12 of the bracket 11. A plurality of cross wires 32 are secured to the frame for supporting any suitable bait thereon.

When it is desired to set the trap, the relatively movable strangulating ring 19 is shifted over against the tension of the spring 21 to a position directly above the normally stationary ring 6, and the trigger 16 is then positioned in advance of said ring, as clearly shown in Fig. 4 of the drawings. The bait plate is then swung upon its pivot in advance of the trigger 16 and in engagement with the free end thereof. It will thus be observed that the spring 21 tends to urge the ring 19 toward that end of the frame, and that this movement is prevented by the trigger 16 bearing against the bait plate 26.

In practice, the trap is positioned upon the ground and over a hole as clearly shown in Fig. 4 of the drawings, the bait plate 26 being positioned to readily swing upwardly to release the trigger 19. In actuating the trap, an animal will necessarily push upwardly against the bait plate 26, and thereby release the trigger 19, the movement of said trigger permitting the spring 21 to draw the relatively movable ring in a direction to strangle the animal, as will be readily understood. A wire 32 forming a combined piercing means and stop for the strangulating ring 19 is centrally bent around the guide element 17, thence around the stationary ring 6 on opposite sides of the portions 7 of the frame and has its end portions projecting in a direction toward the trigger 16. The free ends of this element are sharpened and are adapted to coöperate with the strangulating ring 19 to pierce the neck of a gopher or other animal.

What is claimed is:

1. In a trap, the combination with a main frame consisting of a length of strap iron centrally bent to form a stationary strangulating ring, the extreme ends of the end portions beyond the ring being disposed in spaced relation, a cross bar connecting the extreme ends of the frame, a movable strangulating ring normally disposed above the stationary ring, a resilient means connecting the cross bar of the frame and the movable ring for urging the latter longitudinally of said stationary ring, a bait plate connected hingedly to the frame and adapted to be normally disposed above the movable ring, and a trigger carried by the frame engageable with the movable ring and the bait plate to hold the former in its operative position against the tension of said resilient means.

2. In a trap, the combination with a main frame consisting of a length of strap iron centrally bent to form a stationary strangulating ring, the extreme ends of the end portions beyond the ring being disposed in spaced relation, a cross bar connecting the extreme ends of the frame, a movable strangulating ring normally disposed above the stationary ring, a coil spring disposed around the cross bar and having one end fixedly secured to one end of the frame and its other end terminating in a radially extending arm, a link connecting the radial arm of the spring and the movable ring, a bait plate connected hingedly to the frame and adapted to be normally disposed above the movable ring, and a trigger carried by the frame engageable with the movable ring and the bait plate to hold the former in its operative position against the tension of said resilient means.

3. In a trap, the combination with a main frame consisting of a length of strap iron centrally bent to form a stationary strangulating ring, the extreme ends of the end portions beyond the ring being disposed in spaced relation, a cross bar connecting the extreme ends of the frame, a movable strangulating ring normally disposed above the stationary ring, a resilient means connecting the cross bar of the frame and the movable ring for urging the latter longitudinally of the said stationary ring, a bracket secured to the stationary ring, a bait plate hingedly connected to said bracket and adapted to swing over the stationary ring, and a trigger carried by the frame engageable with the movable ring and the bait plate to hold the former in its operative position against the tension of said resilient means.

In testimony whereof, I affix my signature, in presence of two witnesses.

WILLIAM C. GOWDY.

Witnesses:
WILLIAM T. GOWDY,
JAMES B. McGUIRE.

---

Copies of this patent may be obtained for five cents each, by addressing the "Commissioner of Patents, Washington, D. C."